(12) United States Patent
Wang

(10) Patent No.: US 11,363,174 B2
(45) Date of Patent: Jun. 14, 2022

(54) LENS MODULE WITH AIR HOLE AND ELECTRONIC DEVICE HAVING LENS MODULE

(71) Applicant: TRIPLE WIN TECHNOLOGY (SHENZHEN) CO. LTD., Shenzhen (CN)

(72) Inventor: Hung-Kun Wang, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/199,676

(22) Filed: Mar. 12, 2021

(65) Prior Publication Data

US 2021/0392246 A1 Dec. 16, 2021

(30) Foreign Application Priority Data

Jun. 10, 2020 (CN) .......................... 202010525112.4

(51) Int. Cl.
*H04N 5/225* (2006.01)
*G02B 7/00* (2021.01)
*H04N 5/232* (2006.01)

(52) U.S. Cl.
CPC ............ *H04N 5/2253* (2013.01); *G02B 7/00* (2013.01); *H04N 5/2252* (2013.01); *H04N 5/2254* (2013.01); *H04N 5/2257* (2013.01); *H04N 5/23248* (2013.01)

(58) Field of Classification Search
CPC .. H04N 5/2251; H04N 5/2252; H04N 5/2253; H04N 5/2254; H04N 5/2257; H04N 5/23248–2329; H04N 5/22521; H05K 1/0274; G03B 17/55; G02B 7/00–02
See application file for complete search history.

(56) References Cited

U.S. PATENT DOCUMENTS

| 10,027,865 | B1* | 7/2018 | Tsai | H04N 5/2257 |
| 2004/0256687 | A1* | 12/2004 | Omori | H01L 27/14618 257/433 |
| 2005/0014307 | A1* | 1/2005 | Shiraishi | H01L 27/14683 438/60 |
| 2012/0229701 | A1* | 9/2012 | Pavithran | H04N 5/2252 348/374 |
| 2012/0230670 | A1* | 9/2012 | Hirooka | H01L 27/14683 396/529 |
| 2013/0242183 | A1* | 9/2013 | Lee | H04N 5/2252 348/374 |

(Continued)

*Primary Examiner* — James M Hannett
*Assistant Examiner* — Akshay Trehan
(74) *Attorney, Agent, or Firm* — ScienBiziP, P.C.

(57) ABSTRACT

A lens module includes a circuit board, a carrier, and a photosensitive chip. The carrier and the photosensitive chip are arranged on a surface of the circuit board. The carrier includes a first surface arranged facing the circuit board and a second surface facing away from the circuit board. A window is defined in the carrier penetrating the first surface and the second surface. The photosensitive chip is received in the window. The carrier, the photosensitive chip, and the circuit board cooperatively form an enclosed space. An adhesive filler is arranged in the enclosed space. At least one air hole is defined in the adhesive filler. The at least one air hole communicates an inside of the enclosed space to outside the enclosed space.

18 Claims, 6 Drawing Sheets

(56) References Cited

U.S. PATENT DOCUMENTS

| | | | |
|---|---|---|---|
| 2017/0280558 A1* | 9/2017 | Ohara | G03B 17/55 |
| 2018/0217361 A1* | 8/2018 | Yoshioka | G02B 3/0075 |
| 2019/0170920 A1* | 6/2019 | Park | H04N 5/225 |
| 2019/0265577 A1* | 8/2019 | Park | G02B 7/025 |
| 2019/0373150 A1* | 12/2019 | Chen | G03B 17/55 |
| 2020/0137272 A1* | 4/2020 | Ding | H04N 5/2254 |

* cited by examiner

LENS MODULE WITH AIR HOLE AND ELECTRONIC DEVICE HAVING LENS MODULE

FIELD

The subject matter herein generally relates to lens modules, and more particularly to a lens module for releasing pressure from inside the lens module and an electronic device having the lens module.

BACKGROUND

The existing lens module generally includes a lens, a carrier, a photosensitive chip, and a circuit board. In a manufacturing process of the lens module, after attaching an anisotropic conductive film (ACF) to a solder pad of the carrier, the circuit board is attached to the other side of the ACF. However, gas in an enclosed space formed by the circuit board, the carrier, and the photosensitive chip will expand the ACF due to thermal expansion, thereby affecting a quality of the lens module.

BRIEF DESCRIPTION OF THE DRAWINGS

Implementations of the present disclosure will now be described, by way of embodiments, with reference to the attached figures.

DETAILED DESCRIPTION

Figure 1:
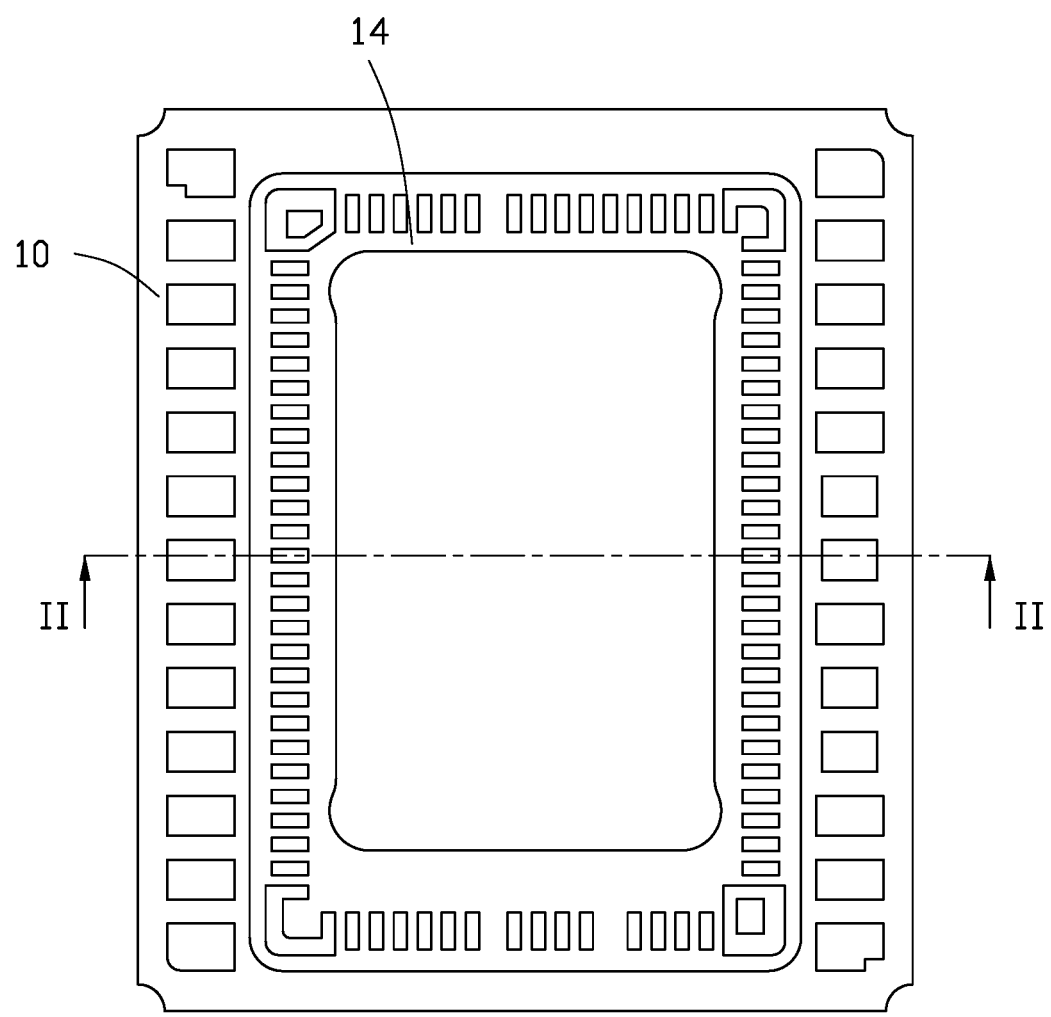
FIG. 1 is a top view of a carrier in a lens module according to an embodiment of the present disclosure.
Figure 2:
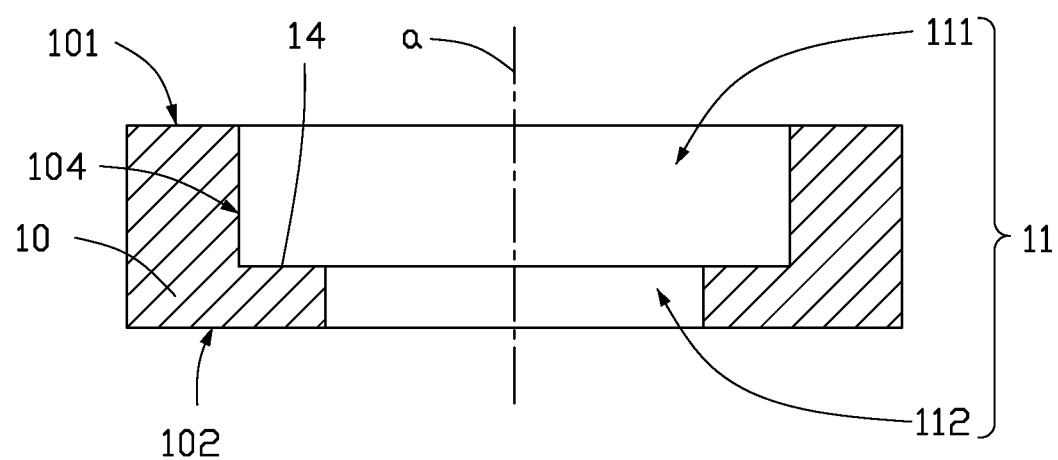
FIG. 2 is a cross-sectional view taken along line II-II in FIG. 1.
Figure 3:
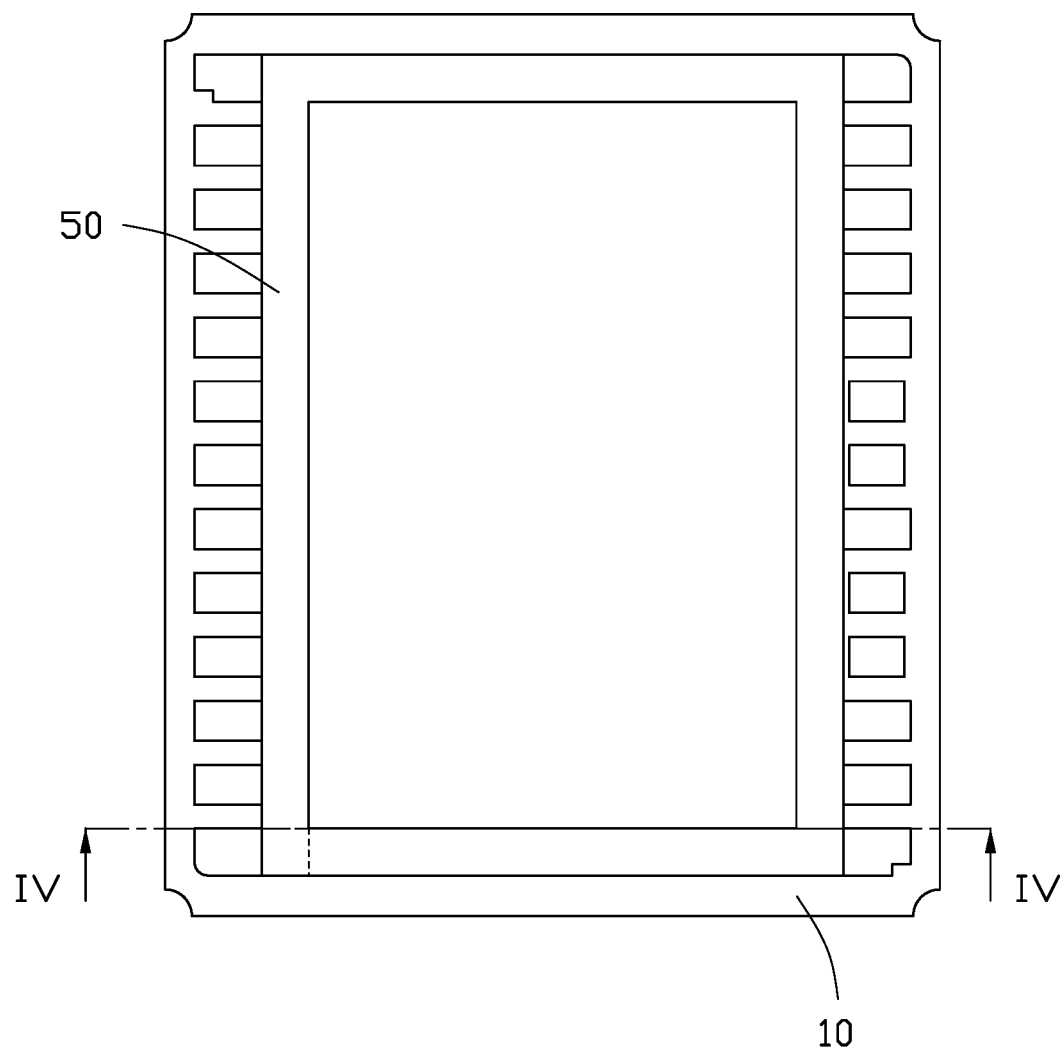
FIG. 3 is a top view of a lens module according to an embodiment of the present disclosure.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIGS. 1-4 show an embodiment of a lens module 100. The lens module 100 includes a circuit board 50, a carrier 10 arranged on a surface of the circuit board 50, a photosensitive chip 30, and a lens 70.

The carrier 10 is substantially a hollow rectangular parallelepiped frame structure. The carrier 10 includes a first surface 101 facing the circuit board 50 and a second surface 102 facing away from the first surface 101. A window 11 penetrating through the first surface 101 and the second surface 102 is defined in a middle portion of the carrier 10. The window 11 is substantially rectangular. In other embodiments, a shape of the window 11 corresponds to a shape of the photosensitive chip 30. The window 11 has a central axis a. The carrier 10 includes a side wall 104 and a protrusion 14 extending from the side wall 104 toward the central axis a. The window 11 includes a first window portion 111 and a second window portion 112 communicating with the first window portion 111. The side wall 104 surrounds the first window portion 111. The photosensitive chip 30 is received in the first window portion 111. The protrusion 14 surrounds the second window portion 112. The carrier 10 further includes at least one solder pad 103 located on the first surface 101. A conductive film 20 is provided on each solder pad 103. In one embodiment, the conductive film 20 is an anisotropic conductive film (ACF).

The photosensitive chip 30 is received in the first window 111 and arranged on the protrusion 14. An adhesive filler 40 is provided between the photosensitive chip 30 and the carrier 10, so that the photosensitive chip 30 is fixed on the carrier 10 and a stability of the photosensitive chip 30 in the first window portion 111 is improved.

At least one electrode 31 is provided on a side of the photosensitive chip 30 facing away from the circuit board 50. The electrode 31 is used to electrically couple the photosensitive chip 30 to a circuit (not shown) in the carrier 10. In one embodiment, the circuit is a golden ball. The photosensitive chip 30 includes a photosensitive area 301 facing the second window portion 112 and a non-photosensitive area 302 arranged around the photosensitive area 301. A width of the photosensitive area 301 may be slightly less than or equal to a width of the second window portion 112.

The circuit board 50 is arranged on the first surface 101 of the carrier 10 through the conductive film 20. The circuit board 50, the carrier 10, the photosensitive chip 30, and the adhesive filler 40 cooperatively form an enclosed space 60.

The lens 70 is arranged on the second surface 102 of the carrier 10 through an adhesive layer 71. The lens 70 includes a first lens portion 701 and a second lens portion 702 coupled to the first lens portion 701. The first lens portion 701 is located between the carrier 10 and the second lens portion 702. A diameter of the first lens portion 701 is larger than a diameter of the second lens portion 702. The first lens portion 701 and the second lens portion 702 may be assembled together or integrally formed. When integrally formed, the first lens portion 701 and the second lens portion 702 are integrally molded to form the lens 70. The lens 70 may be made of metal or plastic.

In one embodiment, in order to disperse heat and gas from the enclosed space 60, at least one air hole 13 is defined in the adhesive filler 40, and each air escape hole 13 couples an inside of the enclosed space 60 to outside of the enclosed space 60. The heat and gas in the enclosed space 60 are released, so that an internal pressure of the enclosed space 60 is reduced, the circuit board 50 is not stressed, and reliability of the lens module 100 is improved.

In one embodiment, the adhesive filler 40 between the photosensitive chip 30 and the side wall 104 will extend laterally between a surface of the protrusion 14 and the photosensitive chip 30 to form an L-shaped structure. Since the electrode 31 is provided between the photosensitive chip 30 and the protrusion 14, the adhesive filler 40 will bypass the electrode 31. The air hole 13 may be arranged at a corner of the side wall 104. The air hole 13 penetrates the adhesive filler 40, so that a shape of the air hole 13 is L-shaped. The air hole 13 is defined around the electrode 31. In this way, the L-shaped air hole 13 can communicate the inside of the enclosed space 60 to the second window portion 112 to release the heat and gas from the enclosed space 60. Thus, the internal pressure of the enclosed space 60 is released and does not affect stability of the photosensitive chip 30.

Specifically, the air hole 13 releases the pressure of the enclosed space 60 in the following three situations.

Figure 4:
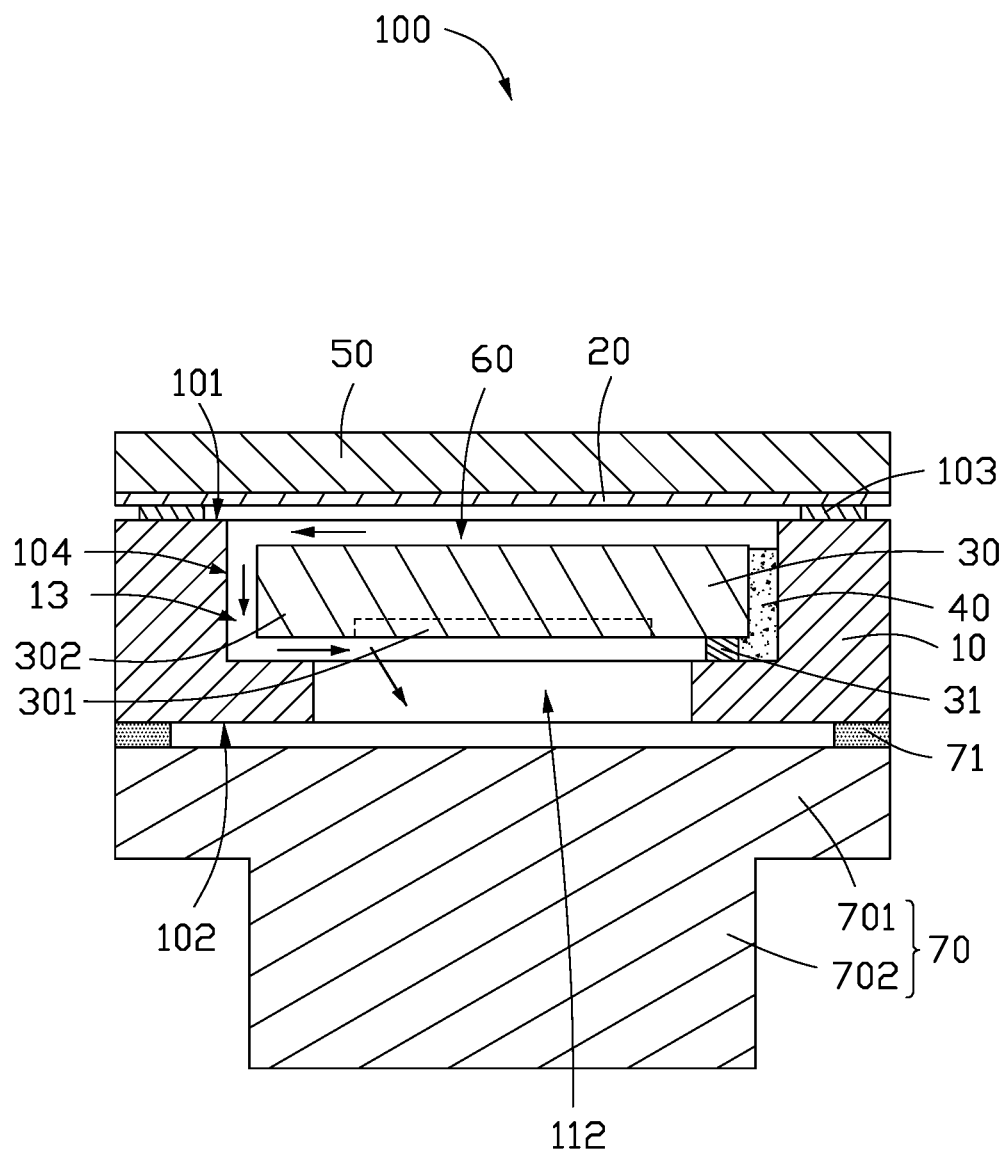
FIG. 4 is a cross-sectional view taken along line IV-IV in FIG. 3.

In a first situation, during a process of attaching the conductive film 20 and the circuit board 50, after the conductive film 20 is attached to the solder pad 103, the circuit board 50 is attached to the first surface 101 of the carrier 10 through the conductive film 20, and the conductive film 20 and the circuit board 50 are press-fitted and fixed to the carrier 10 by high temperature and high pressure. At this time, the gas in the enclosed space 60 will expand in volume due to heat. Then, the air hole 13 can timely release the gas and heat in the enclosed space 60 to the outside, thereby preventing damage between the circuit board 50 and the carrier 10 and improving the quality of the lens module 100. Due to the existence of the air hole 13, an amount of the conductive film 20 can be reduced, and the circuit board 50 can be stably fixed on the carrier 10 with a small amount of the conductive film 20, thereby improving a bonding accuracy. A flow direction of the gas and heat in the enclosed space 60 is shown in FIG. 4. In the first situation, the air hole 13 is in communication with the outside, and the lens 70 is not yet assembled.

In a second situation, after the first situation, the semi-finished lens module with the conductive film 20 and the circuit board 50 is subjected to a pressure cook test (PCT) destructive test, and the destructive test conditions are generally 100% humidity/121° C./2 CC. In this environment, the gas in the enclosed space 60 is easily expanded by heat. At this time, the air hole 13 can timely release the gas and heat in the enclosed space 60 through the air hole 13, thereby preventing damage between the circuit board 50 and the carrier 10, increasing a tolerance time of the PCT destructive test, and improving the quality of the lens module 100.

In a third situation, after the lens module 100 is assembled finished product is assembled, during testing or in use, the gas in the enclosed space 60 will expand due to heating. At this time, the air hole 13 can timely release the gas and heat in the enclosed space 60 through the air hole 13. Since the amount of gas in the enclosed space 60 is not very large and the amount of heat generated during use is limited, a small amount of heat and gas are released through the air hole 13, thereby preventing damage between the circuit board 50 and the carrier 10 and improving the quality of the lens module 100.

Figure 6:
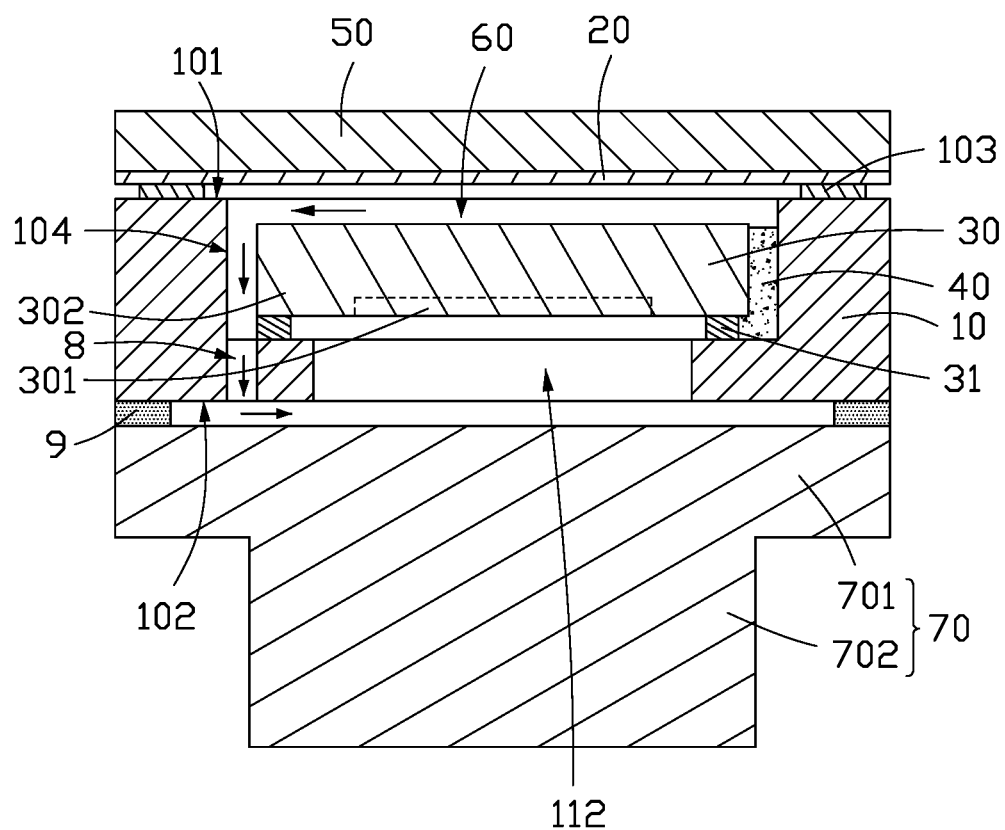
FIG. 6 is a cross-sectional diagram of a lens module according to another embodiment of the present disclosure.

FIG. 6 shows a second embodiment of the lens module 100. In the second embodiment, an air hole 8 is defined in the protrusion 14, and the air hole 8 penetrates the protrusion 14 toward the central axis a. Further, in the second embodiment, the adhesive filler 40 is not provided on a side of the air hole 8 facing the enclosed space 60. In order to improve an exhaust effect, an adhesive layer 9 is arranged on one side of the air hole 8. By defining the air hole 8 directly in the protrusion 14, the air hole 8 is a straight hole which directly communicates the inside of the enclosed space 60 to the outside, thereby improving efficiency of gas release.

Figure 5:
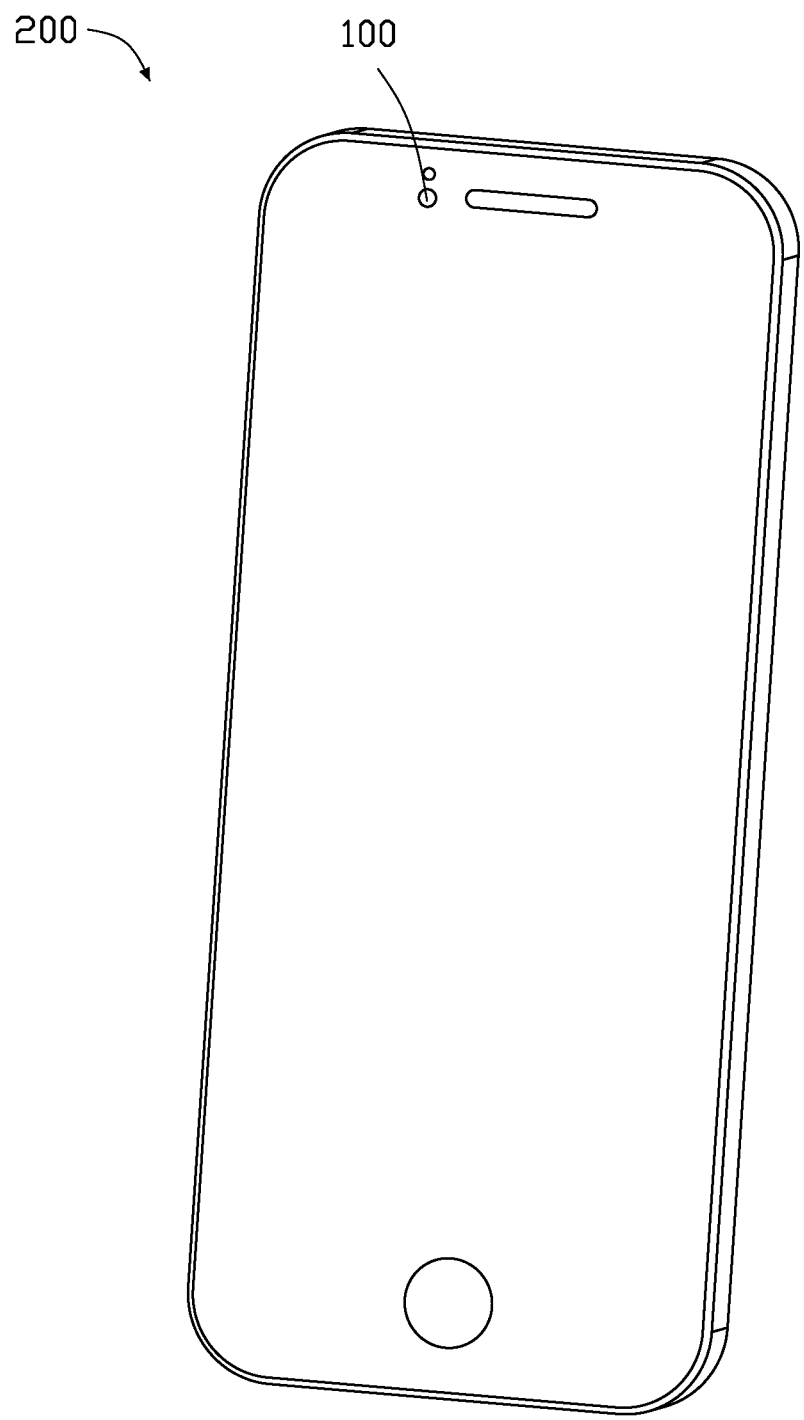
FIG. 5 is a schematic diagram of an electronic device having a lens module according to an embodiment of the present disclosure.

FIG. 5 shows an embodiment of an electronic device 200 having the lens module 100. The electronic device may be a mobile phone, a wearable device, a vehicle, a camera, a monitoring device, or other device requiring the lens module 100.

In summary, the air hole 13 communicates the inside of the enclosed space 60 to the outside, so that gas and heat in the enclosed space 60 are timely release, thereby preventing damage to the circuit board 50 and the carrier 10 and improving the quality of the lens module 100.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens module comprising:
a circuit board;
a carrier; and
a photosensitive chip; wherein:
the carrier and the photosensitive chip are arranged on a surface of the circuit board;
the carrier comprises a first surface arranged facing the circuit board and a second surface facing away from the circuit board;
a window is defined in the carrier penetrating the first surface and the second surface;
the photosensitive chip is received in the window;
the carrier, the photosensitive chip, and the circuit board cooperatively form an enclosed space;
an adhesive filler is arranged in the enclosed space;
at least one air hole is defined in the adhesive filler; and
the at least one air hole extends to an exterior of the enclosed space;
wherein the window defines a central axis, the carrier comprises a side wall and a protrusion extending from the side wall toward the central axis, the at least one air hole penetrates the protrusion.

2. The lens module of claim 1, wherein:
the air hole extends toward the central axis.

3. The lens module of claim 2, wherein the window comprises a first window portion and a second window portion communicating with the first window portion, and the side wall is surrounded by In the first window portion, the photosensitive chip is located in the first window portion, and the protrusion is surrounded to form the second window portion.

4. The lens module of claim 3, wherein:
the photosensitive chip comprises a photosensitive area and a non-photosensitive area around the photosensitive area, the photosensitive area facing the second window portion; and
a width of the photosensitive area is less than or equal to a width of the second window portion.

5. The lens module of claim 1, wherein:
the carrier further comprises at least one solder pad on the first surface;
the at least one solder pad is provided with a conductive film; and
the circuit board is arranged on the first surface of the carrier through the conductive film.

6. The lens module of claim 5, wherein:
the conductive film is an anisotropic conductive film.

7. The lens module of claim 1, wherein:
at least one electrode is provided on a surface of the photosensitive chip facing away from the circuit board; and
the at least one electrode is electrically coupled to the photosensitive chip to the carrier.

8. The lens module of claim 1, further comprising a lens, wherein:
the lens is mounted on the second surface of the carrier;
the lens comprises a first lens portion and a second lens portion coupled to the first lens portion;
the first lens portion is between the carrier and the second lens portion; and
a diameter of the first lens portion is larger than a diameter of the second lens portion.

9. The lens module of claim 8, wherein:
the first lens portion and the second lens portion are assembled together or integrally formed.

10. An electronic device comprising a lens module, the lens module comprising:
a circuit board;
a carrier; and
a photosensitive chip; wherein:
the carrier and the photosensitive chip are arranged on a surface of the circuit board;
the carrier comprises a first surface arranged facing the circuit board and a second surface facing away from the circuit board;
a window is defined in the carrier penetrating the first surface and the second surface;
the photosensitive chip is received in the window;
the carrier, the photosensitive chip, and the circuit board cooperatively form an enclosed space;
an adhesive filler is arranged in the enclosed space;
at least one air hole is defined in the adhesive filler; and
the at least one air hole communicates an inside of the enclosed space to outside the enclosed space;
wherein the window defines a central axis, the carrier comprises a side wall and a protrusion extending from the side wall toward the central axis, the at least air hole penetrates the protrusion.

11. The electronic device of claim 10, wherein:
the air hole is extending toward the central axis.

12. The electronic device of claim 11, wherein the window comprises a first window portion and a second window portion communicating with the first window portion, and the side wall is surrounded by In the first window portion, the photosensitive chip is located in the first window portion, and the protrusion is surrounded to form the second window portion.

13. The electronic device of claim 12, wherein:
the photosensitive chip comprises a photosensitive area facing the second window portion and a non-photosensitive area arranged around the photosensitive area; and
a width of the photosensitive area is less than or equal to a width of the second window portion.

14. The electronic device of claim 10, wherein:
the carrier further comprises at least one solder pad on the first surface;
the at least one solder pad is provided with a conductive film; and
the circuit board is arranged on the first surface of the carrier through the conductive film.

15. The electronic device of claim 14, wherein:
the conductive film is an anisotropic conductive film.

16. The electronic device of claim 10, wherein:
at least one electrode is provided on a surface of the photosensitive chip facing away from the circuit board; and
the at least one electrode is used to electrically couple the photosensitive chip to the carrier.

17. The electronic device of claim 10, further comprising a lens, wherein:
the lens is mounted on the second surface of the carrier;
the lens comprises a first lens portion and a second lens portion coupled to the first lens portion;
the first lens portion is located between the carrier and the second lens portion; and
a diameter of the first lens portion is larger than a diameter of the second lens portion.

18. The electronic device of claim 17, wherein:
the first lens portion and the second lens portion are assembled together or integrally formed.

* * * * *